(12) United States Patent
Meessen et al.

(10) Patent No.: US 8,410,031 B2
(45) Date of Patent: Apr. 2, 2013

(54) METHOD FOR PREPARING AN IMIDIZED POLYMER

(75) Inventors: Patric Meessen, La Calamine (BE); Johannes Hendrik Geesink, Schinnen (NL)

(73) Assignee: Lanxess Elastomers B.V., Geleen (NL)

( * ) Notice: Subject to any disclaimer, the term of this patent is extended or adjusted under 35 U.S.C. 154(b) by 1348 days.

(21) Appl. No.: 11/666,650

(22) PCT Filed: Nov. 4, 2005

(86) PCT No.: PCT/EP2005/011904
§ 371 (c)(1),
(2), (4) Date: Sep. 4, 2007

(87) PCT Pub. No.: WO2006/048328
PCT Pub. Date: May 11, 2006

(65) Prior Publication Data
US 2008/0293601 A1    Nov. 27, 2008

Related U.S. Application Data

(60) Provisional application No. 60/625,592, filed on Nov. 8, 2004.

(30) Foreign Application Priority Data

Nov. 4, 2004 (EP) .................................... 04078032
Dec. 15, 2004 (EP) .................................... 04078399

(51) Int. Cl.
*C10M 149/00* (2006.01)
*C10M 159/12* (2006.01)
*C08F 8/32* (2006.01)

(52) U.S. Cl. ........ 508/256; 508/221; 508/231; 508/235; 508/241; 508/269; 508/296; 525/186; 525/293; 525/375

(58) Field of Classification Search .................... 264/85; 525/293; 508/228, 221; 428/412; 546/117
See application file for complete search history.

(56) References Cited

U.S. PATENT DOCUMENTS 3,651,171 A * 3/1972 von Bonin et al. ............. 525/73
5,075,383 A  12/1991 Migdal et al.
(Continued)

FOREIGN PATENT DOCUMENTS

EP  0 328 140 A2  8/1989
EP  0 338 672 A1  10/1989
(Continued)

OTHER PUBLICATIONS

International Search Report mailed Jan. 13, 2006 in PCT/EP2005/011904.
(Continued)

*Primary Examiner* — Ellen McAvoy
*Assistant Examiner* — Chantel Graham
(74) *Attorney, Agent, or Firm* — Nixon & Vanderhye P.C.

(57) ABSTRACT

A process is provided for preparing an imidized polymer in a mixing or kneading device, by a reaction in the presence of an acid of a mixture containing a polymer having anhydride groups or derivatives thereof and an aromatic polyamine compound. A solid multifunctional viscosity modifier is also provided which includes a polymer having between 0.1 and 10 functional groups per 1000 C-atoms. The functional groups include aromatic amine based imide groups with a ratio of imide groups to the functional groups being more than 0.85.

14 Claims, 4 Drawing Sheets

Figure 1:
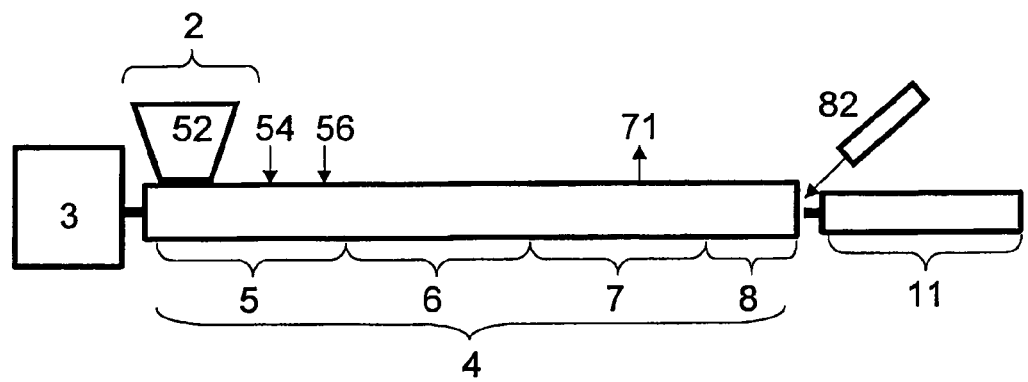

U.S. PATENT DOCUMENTS 5,112,508 A    5/1992  De Rosa et al.
5,552,096 A *  9/1996  Auda et al. ..................... 264/85
6,107,257 A *  8/2000  Valcho et al. ................. 525/293

FOREIGN PATENT DOCUMENTS

| EP | 0 654 486 A2 | 5/1995 |
|---|---|---|
| EP | 0 728 767 A1 | 8/1996 |
| EP | 0 922 752 A2 | 6/1999 |

OTHER PUBLICATIONS

Written Opinion mailed Jan. 13, 2006 in PCT/EP2005/011904.

* cited by examiner

METHOD FOR PREPARING AN IMIDIZED POLYMER

This application is the US national phase of international application PCT/EP2005/011904 filed 4 Nov. 2005 which designated the U.S. and claims benefit of EP 04078032.2; U.S. 60/625,592; EP 04078399.5, dated 4 Nov. 2004; 8 Nov. 2004; 15 Dec. 2004, respectively, the entire content of which is hereby incorporated by reference.

The invention relates to a method for preparing an imidized polymer, and in particular a multifunctional viscosity modifier, by reacting in a mixing device or kneading device a polymer comprising anhydride groups, or derivatives thereof, with an aromatic polyamine compound. A multifunctional viscosity modifier is typically used to make an oil concentrate, which is applied in a lubricating oil. When an imide is formed, by a reaction of a polyamine, comprising at least one primary amine functionality with an anhydride group of the polymer, amine functionality can be introduced into the polymer. By virtue of its reaction to form an imide, the basicity of the primary amine group is lost, but the other amine groups remain basic and will react as a base, as for example with acids. For this reason the resulting imide, which is a polymer exhibiting the properties of a base, is useful in lubricating oils, such as automotive engine oils. In this application the amine is thought to react with acidic species generated by oxidation of the oil during use. Another important property of the imidized polymer is its capacity to reduce the tendency of agglomeration of soot particles, thus preventing unacceptable viscosity increase and reducing the precipitation of soot and sludge in the oil and the deposition of varnish on automotive engine parts, thereby contributing to desirable reduction of engine part wear. Moreover the aromatic amine groups provide antioxidant properties. The polymeric nature of the imide also contributes to desirable modification of the viscosity of the lubricating oil. This type of product is generally referred to as a multifunctional viscosity modifier, recognizing that it performs more than one function when used as an automotive lubricating oil additive.

A method for preparing an imidized polymer is known from U.S. Pat. No. 5,552,096. This patent describes a reaction in an extruder between a polymer with grafted anhydride groups and a polyamine compound. In the examples 4-(3-aminopropyl)morpholine and 1-(2-aminoethyl)piperazine have been used. As these amines are more reactive than aromatic amines, a drawback of the known process for aromatic polyamines is, that the conversion to the imidized polymer is not more than about 80%. This means that about 20% of the anhydride groups will not be converted to imide groups. In the presence of water, these anhydride groups will be partly or totally converted to acyl groups. Another part of the anhydride groups may be converted to amides. Such low degree of conversion generally causes two problems in multifunctional viscosity modifiers:

First, the remaining acid and amide groups tend to form strong hydrogen and ionic bonded systems, thus causing significant viscosity increases of the oil solution.

Secondly, remaining aromatic primary amines are sensitive for oxidation, thus rapidly causing lubricant oil to discolorate. This requires that low molecular weight alcohols and aldehydes have to be added to oil comprising the imidized polymer according to the state of the art to cap the acyl and primary amine groups.

An imidized polymer can also be obtained by carrying out the imidization reaction in a solvent, as described in e.g. U.S. Pat. No. 5,075,383. However, in order to avoid gelation by chain interactions during the reaction and to dissolve the aromatic polyamine a surfactant e.g. a polyethoxylated alcohol like Surfonic® is added to the reaction. To avoid discoloration of the surplus of aromatic polyamine, an aldehyde is also added as described in e.g. U.S. Pat. No. 5,207,938. The presence of these compounds in oil additives is undesirable, because they cause haze and bad odour and increase costs.

A purpose of the present invention is to provide a process for preparing an imidized polymer, with a reduced amount of unreacted acyl groups with respect to the acyl groups originally present in the polymer.

Another purpose of the present invention is to provide a process, for preparing an imidized polymer with an as low as possible amount of free and amid-bound polyamine.

In the process of the invention this aim is achieved, by a process for preparing an imidized polymer in a mixing or kneading device, by a reaction of a mixture, comprising a polymer, comprising anhydride groups, or derivatives thereof, and an aromatic polyamine compound, characterized in that the reaction is carried out in the presence of an acid.

With the process of the invention the incomplete imidized anhydride groups have been reduced with about 75%.

A particular advantage of the product made by the process of the invention is, that it results in a solid viscosity modifier, wherein the ratio of imide to the total number of functional groups (i.e. imide, amide & anhydride groups) is more than 0.85, preferably more than 0.90 and most preferably more than 0.95. This high ratio increases the stabilitae of the imidized product as multifunctional viscosity modifier and reduces the need for extra additives. The advantage of a solid multifunctional viscosity modifier is the lower costs for storage and shipping of this material with respect to its solutions, as well as its base-oil independent applicability.

In the process of the invention a reaction is carried out between a polymer, comprising anhydride groups, or derivatives thereof, and an aromatic polyamide compound. Polymers used as starting materials in the process of this invention are preferably based on olefinic polymers. An olefinic polymer containing anhydride groups, or derivatives thereof, can be obtained by reacting an anhydride group, or a derivative thereof, with an olefinic polymer according to a method known in the art. A preferred method is free radical grafting of an unsaturated anhydride onto a polymer as described in e.g. U.S. Pat. No. 5,075,383.

Olefinic polymers may comprise the various forms of polyethylene, ethylene-propylene co-polymers, other ethylene copolymers with comonomers such as 1-butene, isobutylene, as well as with hetero containing monomers such as vinyl acetate, maleic anhydride, ethyl acrylate, methyl acrylate; generally alpha-olefin and cyclic olefin homopolymers and copolymers; polymers from dienes, such as styrenebutadiene rubber, polyisoprene, ethylene-propylene diene terpolymers (EPDM), styrene-diene copolymers including block and star-branched copolymers and hydrogenated styrene-diene copolymers, substantially hydrogenated isoprene linear and star-branched polymers, or blends thereof.

Preferred polymers for a multifunctional viscosity modifier are EP(D)M copolymers. The preferred EP(D)M polymers contain from 15 to 80 wt % of ethylene, from 0 to 15 wt % of a polyene, selected from non-conjugated dienes and trienes, and the balance being a $C_3$-$C_{10}$ alpha olefin. Suitable non-conjugated diene monomers which may be used in the terpolymer (EPDM) are hexadiene, dicyclopentadiene, ethylidene norbornene, and vinylidene norbornene. Examples of EP(D)M types for making an elastomer containing anhydride groups via a free radical grafting process are Keltan 312 a polymer having a Mooney viscosity at 125° C. of about 33, and an ethylene content of about 49 wt % and Keltan 3200A, a polymer having a Mooney viscosity at 100° C. of about 51, and an ethylene content of about 49 wt %. (Royal DSM N.V., the Netherlands).

The polymer comprising anhydride groups comprises between 0.1 and 10 anhydride groups per 1000 C-atoms. The preferred olefinic polymer comprising anhydride groups therefore comprises from 15 to 80 wt % of ethylene, from 0 to 15 wt % of a polyene, selected from non-conjugated dienes and trienes, and the balance being a $C_3$-$C_{10}$ alpha olefin, and from 0.1 to 10 anhydride groups per 1000 C-atoms and may have a number average molecular weight of between 5,000 and 500,000 g/mol, and preferably between 20,000 and 150,000 g/mol.

The preferred carboxylic groups are unsaturated mono-, and poly-carboxylic acids and cyclic anhydrides, salts, esters, and other substituted derivatives from said acids and anhydrides. Examples of such acids, anhydrides and derivatives thereof include maleic acid, fumaric acid, himic acid, itaconic acid, citraconic acid, mesaconic acid, maleic anhydride, himic anhydride, dibutyl fumarate. The preferred grafted functional compound is maleic anhydride.

By aromatic polyamine is understood a compound comprising at least 2 amine groups, of which at least one is a primary amine, an aromatic group and optionally containing other functional groups. Example of functional groups include but are not limited to amines, amides, imides, alcohols, thiols, esters, ethers, acids, guanidines, amidines. Suitable aromatic amines for lubricant oil compositions and therefore subject of this invention include aromatic polyamine compounds from the group consisting of:

(a) an N-arylphenylenediamine represented by the formula:

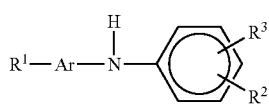

in which Ar is aromatic and $R^1$ is —H, —$NH_2$, —(—NH-Aryl)$_n$-H, —(—NH-Alkyl)$_n$-H, —NH— arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$—)$_m$—$NH_2$, —($CH_2$)$_n$—$NH_2$, -aryl-$NH_2$, in which n and m has a value from 1 to 10, and $R^3$ is hydrogen, alkyl, alkenyl, alkoxyl, aralkyl, alkaryl having from 4 to 24 carbon atoms, preferably is $R^1$ equal H, $R^2$ equal —$NH_2$, and $R^3$ equal H, which is N-phenyl phenylene diamine (NPPDA) and its isomers.

(b) an aminocarbazole represented by the formula:

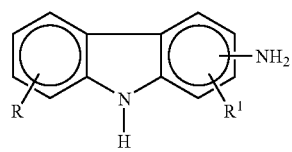

in which R and $R^1$ represent hydrogen or an alkyl, alkenyl, or alkoxyl radical having from 1 to 14 carbon atoms, (c) an aminoindole represented by the formula:

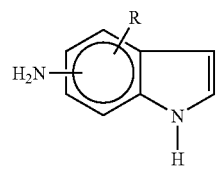

in which R represents hydrogen or an alkyl radical having from 1 to 14 carbon atoms, (d) an amino-indazolinone represented by the formula:

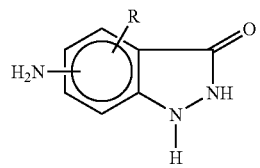

in which R is hydrogen or an alkyl radical having from 1 to 14 carbon atoms, (e) an aminomercaptotriazole represented by the formula:

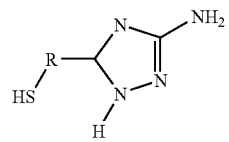

in which R can be absent or can be $C_1$-$C_{10}$ linear or branched hydrocarbon selected from the group consisting of alkyl, aryl, alkaryl, or arylalkyl.

(f) an aminopyrimidine represented by the formula:

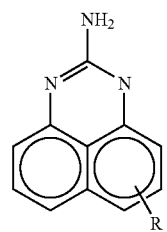

in which R represents hydrogen or an alkyl or alkoxyl radical having from 1 to 14 carbon atoms.

The process of the invention is characterized in that the reaction is carried out in the presence of an acid. Preferably the acid has a pKa <4. The pKa is defined as measured in an aqueous solution at a temperature of 20° C.

Acids used in the process of the invention can be but are not limited to para toluene sulfonic acid (PTSA), n-dodecyl benzene sulfonic acid (DBSA), methane sulfonic acid (MeSO$_3$H) or sulfuric acid (H$_2$SO$_4$), trifluoro acetic acid (CF$_3$CO$_2$H), stannous chloride (SnCl$_2$), aluminum chloride (AlCl$_3$). Preferably the reaction in the process of the invention is carried out in the presence of PTSA or DBSA.

The amount of acid used is preferably between 1 and 4 mol % based on the amount of the polyamine. Below 1 mol % the acid has hardly any effect on the conversion of the anhydride groups to imide groups, while quantities above 4 mol % have turned out to be of little added value.

As mixing or kneading device use can be made for instance of a single-screw extruder, a twin-screw extruder with co-rotating or contra-rotating screws, a Buss® Kokneader, a Farrell® kneader, or a static mixer. It is also possible, for instance, for the apparatus to consist of two or more connected mixing devices selected from the list above. Preferably a co-rotating twin-screw extruder is used.

A typical extruder reactor used in the process of the invention may have the following elements:

A Feed Zone wherein the polymer containing anhydride groups is introduced into the extruder reactor in convenient form. This form includes, for example, pellets, crumb, or a slab stream coming from another mixing device. One method of accomplishing this is to pass the polymer through a drying extruder. In this scenario, the polymer that is fed into the feed zone will already be molten. The feed zone is designed to form the polymer feed into a cohesive mass and convey or pump the mass past a restrictive dam, which follows the feed zone and distinguishes it from the reaction zone. The amine and the acid are added in this zone to the polymer and combined with the polymer by extensive and intensive mixing.

A restrictive dam can be used to separate the feed zone with the first reaction zone, which follows it so as to prevent back leakage of reactants. A restrictive dam can be, for example, a reverse flight screw section, a filled screw section, a shallow flighted screw section, an unflighted screw section, combinations thereof, or other means known in the art. If an unflighted section is used, it can have a larger diameter than the root diameter upstream of it, for example 5-25% larger, but not greater than the screw flight diameter. The restrictive dam length should be from about 0.1 to 4 screw diameters, preferably about 0.2 to about 1 screw diameters in length. If a reverse flighted screw section is employed, it can be single or multiflighted, preferably multiflighted.

In case of the above-mentioned melt feeding this section becomes redundant.

A reaction Zone the part of the extruder reactor where the reaction takes place. A description of these types of mixing can be found in U.S. Pat. No. 3,862,265, which is hereby incorporated by reference. It should be noticed that a restrictive dam configuration is more than a mere separation boundary region between zones, for example, more than merely an unflighted screw section, the restrictive dam can be considered part of the reaction zone itself, for example, when a single or multiflighted reverse flighted screw section is employed. Under such circumstances, the restrictive dam in this region can be part of or comprise the reaction zone. When the reaction zone is operated under a vacuum, the restrictiveness of the dam between the feed and reaction zone can be reduced so as to permit some gas (e.g. air) flow into the reaction zone from the feed zone.

A purification Zone is the region where the solvent, unreacted reagents, by-products, co-products and other volatile impurities from the reaction are removed from the polymer. One preferred means of purifying the polymer is through use of a vent zone. Such vent zone comprises one or more vents with optional vacuum systems to reduce pressure and assist in the stripping of the volatiles and/or solvents. In the case of multiple vents within a vent zone, the vents are separated from each other by restrictive dams similar to those described above. Use of the vacuum system helps to lower the boiling point of the volatile impurities and facilitates their removal.

To further assist the removal or stripping of unreacted reactants, by-products and co-products, the vents may be under reduced pressure and an inert stripping agent, such as nitrogen, may be introduced. The use of nitrogen stripping is particularly helpful in the removal of low molecular weight materials and lowers the vapor phase partial pressure and improves mass transport.

In an Exit Zone, after the last purification zone, the polymer may go through an extension to build up sufficient pressure to extrude the polymer through a die to be cut by an underwater pelletizer. Other exit media such as a turbulator: a strand bath or a gear pump may be used. In applications in which rapid cooling of the product is desired, an underwater pelletizer is preferred. Its advantageous use is illustrated in the examples below.

It is possible for the apparatus to be fed with the polymer in solid form, such as pellets or crumb, in which case the polymer containing anhydride groups is melted and heated to the reaction temperature, following which the process according to the invention is carried out downstream in the apparatus. The acid can be mixed with the polymer pellets or crumb. The acid can also be added to the polymer melt through a feed opening in the wall of the apparatus.

It is also possible for the apparatus to be fed with anhydride containing polymer directly from equipment for the preparation of the anhydride containing polymer from desirable molecular weight and anhydride functionality obtained by the parallel maleation and downshearing reaction, the fed polymer melt having been degassed before the aromatic amine and the acid are added.

The desired average residence time can be reached in various ways. One way of achieving the desired average residence time is to choose a sufficiently large distance between the injection port and the degassing location. It is also possible, for instance, to obtain the desired average residence time by means of the flow rate setting. To achieve a high conversion of the aromatic amine, a high residence time has to be chosen. Preferably, a residence time of 4-10 minutes is chosen. With such a long residence time, a combination of an extruder with a high volume static mixer is preferably used for carrying out the process of the invention.

In a preferred embodiment the Purification Zone and Exit Zone are replaced by a static mixer, followed by a degassing extruder.

The polymer melt in the reaction zone preferably has a temperature of between 250-320° C. For temperatures below 250° C., a too high melt viscosity will result in high torques. A temperature above 320° C. should be avoided as this might cause substantial degradation of the polymer. With more preference, the temperature in the reaction zone is between 275 and 290° C., while the temperature of the material exiting the dye is preferably between 290 and 310° C. Degradation of the polymer can be promoted to a certain extend, by variation of temperature and shear for the production of lower MW derivatives.

As discussed above, one of the possible uses of the imidized polymers made with the process of the invention is as multifunctional viscosity modifiers for lubricating oils. A minor amount, e.g. 0.01 up to 49 wt %, preferably 0.05 to 25 wt %, based on the weight of the total composition, of the multifunctional viscosity modifiers produced in accordance with this invention can be incorporated into a major amount of an oleaginous material, such as a lubricating oil or hydrocarbon fuel, depending upon whether one is forming finished products or additive concentrates. When used in lubricating oil compositions, e.g. automotive or diesel crankcase lubricating oil, derivatized copolymer concentrations are usually within the range of about 0.1 to 10 wt %, of the total composition. The lubricating oils to which the products of this invention can be added include not only hydrocarbon oil derived from petroleum, but also include synthetic lubricating oils such as esters of dibasic acids; complex esters made by esterfications of monobasic acids, polyglycols, dibasic acids and alcohols; polyalphaolefin oils, etc, as e.g. mentioned in U.S. Pat. No. 6,107,257 which is herein included by reference.

The above oil compositions may optionally contain other conventional additives such as pour point depressants, anti-wear agents, antioxidants, other viscosity-index improvers, dispersants, corrosion inhibitors, antifoaming agents, detergents, rust inhibitors, friction modifiers, and the like.

SHORT DESCRIPTION OF THE FIGURES

Figure 2:
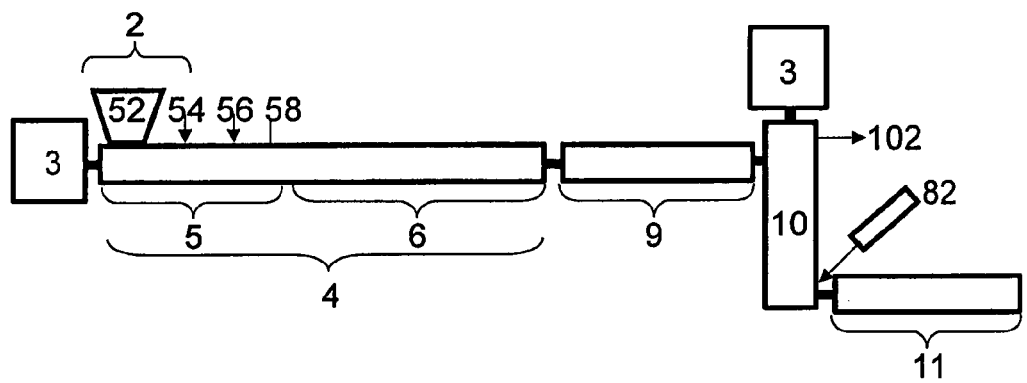
Figure 3:
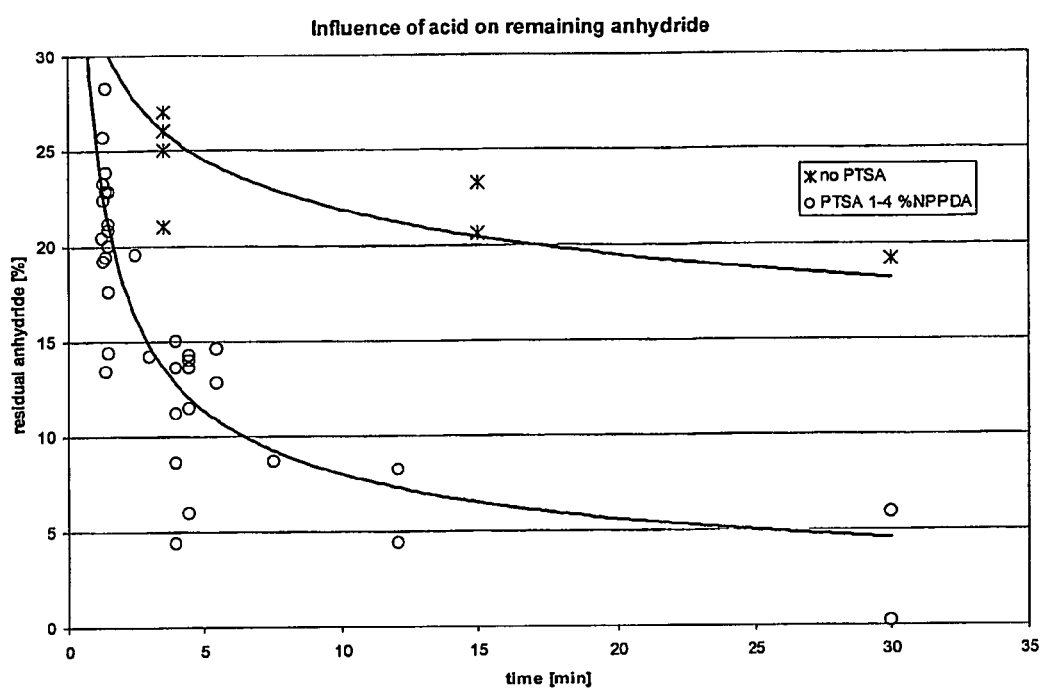
Figure 4:
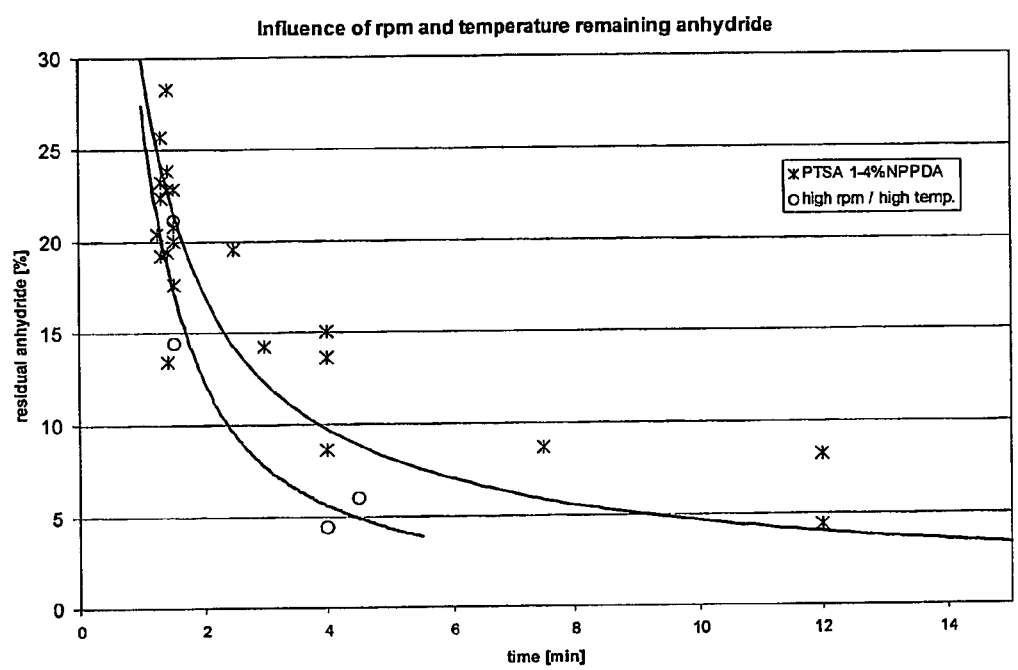
Figure 5:
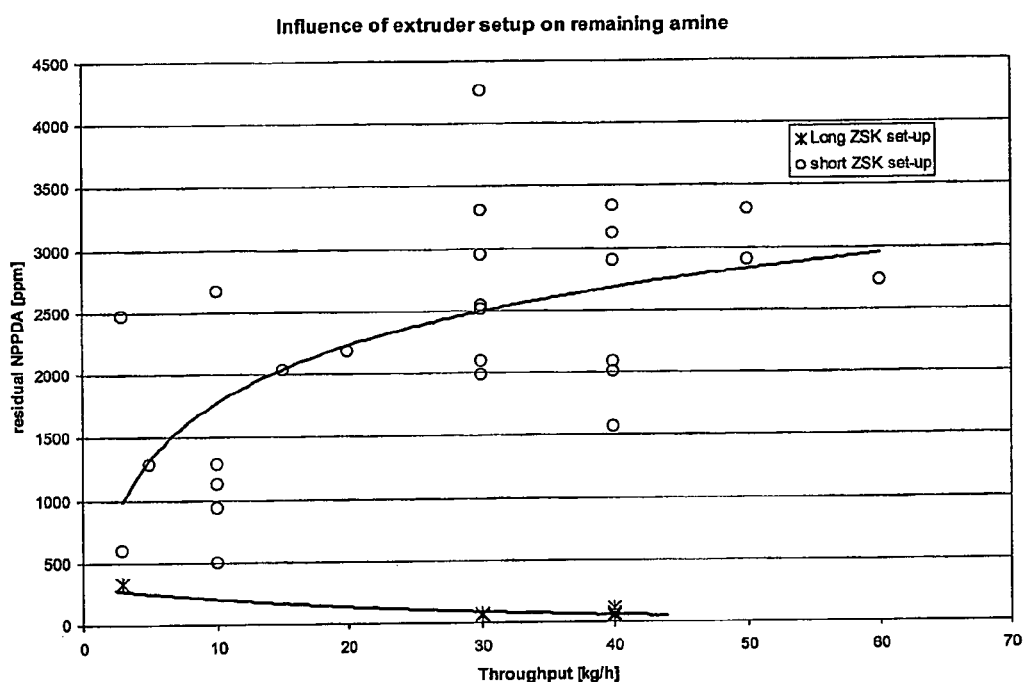

A: FIG. 1 shows a twin-screw extruder.
FIG. 2 shows a twin-screw extruder, followed by a static mixer and a degassing extruder.
FIG. 3 shows the residual anhydride against residence time for the Examples and the Comparative Experiments.
FIG. 4 shows the residual anhydride against the residence time for the Examples only.
FIG. 5 shows the residual NPPDA (free and amide-bound NPPDA) versus the throughput of the extruder.

EXAMPLES

The following examples illustrate useful embodiments of the present invention, in which an imidization of an elastomeric copolymer containing anhydride groups is carried out according to the process of the invention. Some comparative experiments illustrate the state of the art ie an imidization without the presence of an acid and without the presence of a static mixer, followed by a degassing extruder in the exit zone of the twin screw extruder.

FIG. 1 shows a twin-screw extruder with a feeder section 2, a motor 3 and a barrel 4. The extruder barrel 4, comprising a feed zone 5, a reaction zone 6, a purification zone 7 and an exit zone 8 has cores through which water for cooling or steam for heating may be circulated to control the barrel temperature. The feed zone 5 comprises a hopper 52 and two injection points 54 and 56. Vent 71 is connected to a vacuum system (not shown) to reduce pressure and assist stripping of solvent, un-reacted reagents, decomposition products and volatile impurities. An infrared sensor 82 measured the temperature of the extruded material directly after the dye. The imidized polymer is cooled in a water bath 11.

FIG. 2 shows a twin-screw extruder, with a feeder section 2, a motor 3 and a barrel 4. The barrel 4 comprises a feed zone 5, a reaction zone 6, followed by a static mixer 9, after which a single screw degassing extruder 10 is placed. The feed zone 5 comprises a hopper 52 and two injection points 54 and 56 and a thermocouple 58. Vent 102 is connected to a vacuum system (not shown) to reduce pressure and assist stripping of solvent, un-reacted reagents, decomposition products and volatile impurities. An infrared sensor 82 measured the temperature of the extruded material directly after the dye. The imidized product is cooled in water bath 11.

The anhydride containing elastomeric copolymer, based on a ethylene propylene copolymer with an Mw of about 80.000 g/mol, a $C_2/C_3$ weight ratio of 50/50 comprising an average of 3 anhydride groups per 1000 C-atoms was dosed via hopper 52 to the extruder.

NPPDA was dosed at injection point 54, as a melt (THF "no" in Table 1) or 1/1 (w/w) dissolved in THF (THF "yes" in Table 1).

PTSA was dosed at injection point 56 as a 25 wt % solution in THF.

47 Examples L30-1 to L30-2 and 40-1 to L40-37 and comparative experiments 30-A through L30-H have been carried out with different throughputs (Q) and corresponding residence times ($t_v$) on the extruders. As extruders use was made of a ZSK30 mm-44D and a ZSK40 mm-48D, both whether or not extended with a static mixer and a single screw degassing extruder. Another variable was the dosing of NPPDA. The temperature of the barrel ($T_r$) was measured with thermocouple 58 and temperature of the extruded material ($T_p$) was measured directly after the dye with infrared sensor 82.

Conversion of the maleic anhydride functionality was determined after intensive drying and evaporation of free and amide-bound polyamine by FTIR, following the absorption intensity of a representative anhydride peak at 1860 cm$^{-1}$, normalized against the EPM backbone absorption at 722 cm$^{-1}$.

The residual NPPDA and NPPDA bound as amide acid were measured by standard chromatographic methods.

Results are presented in Table 1 and FIGS. 3 to 5.

TABLE 1

| Sample # | Q [kg/h] | NPPDA [g/min] | PTSA [% NPPDA] | THF yes/no | Tv [min] | Tr [° C.] | Tp [° C.] | anh/anh$_0$ [%] | NPPDA* [ppm] |
|---|---|---|---|---|---|---|---|---|---|
| 30-A | 3 | 2.37 | 0 | yes | 3.5 | n.a. | 276 | 21 | 8526 |
| 30-B | 3 | 2.17 | 0 | yes | 3.5 | n.a. | 276 | 26 | 6535 |
| 30-C | 3 | 1.97 | 0 | yes | 3.5 | n.a. | 275 | 27 | 6026 |
| 30-D | 3 | 2.37 | 0 | yes | 3.5 | n.a. | 300 | 25 | 7798 |
| 30-E | 3 | 1.97 | 0 | yes | 3.5 | n.a. | 300 | 36 | 5756 |
| L30-F | 3 | 2.37 | 0 | yes | 30 | 260 | 284 | 19.2 | 6435 |
| L30-G | 6 | 4.73 | 0 | yes | 15 | 261 | 285 | 20.6 | 9440 |
| L30-H | 6 | 3.94 | 0 | yes | 15 | 261 | 285 | 23.2 | 6710 |
| L30-1 | 3 | 1.97 | 2 | yes | 30 | 261 | 285 | 5.9 | 327 |
| L30-2 | 3 | 2.37 | 2 | yes | 30 | 259 | 285 | 0.2 | 5561 |
| 40-1 | 3 | 2.17 | 2 | yes | 12 | 257 | 260 | 8.2 | 594 |
| 40-2 | 5 | 3.61 | 2 | yes | 7.5 | 259 | 259 | 8.7 | 1284 |
| 40-3 | 10 | 7.23 | 2 | yes | 4 | 263 | 283 | 13.6 | 1284 |
| 40-4 | 15 | 10.84 | 2 | yes | 3 | 265 | 282 | 14.2 | 2026 |
| 40-5 | 20 | 14.46 | 2 | yes | 2.5 | 269 | 292 | 19.5 | 2181 |
| 40-6 | 30 | 21.69 | 2 | yes | 1.5 | 273 | 293 | 14.4 | 1981 |
| 40-7 | 30 | 21.69 | 2 | yes | 1.5 | 247 | 291 | 20.8 | 2947 |
| 40-8 | 50 | 36.14 | 2 | yes | 1.3 | 256 | 302 | 23.2 | 3308 |
| 40-9 | 10 | 7.23 | 1 | yes | 4 | 263 | n.a. | 15 | 2669 |
| 40-10 | 30 | 21.69 | 1 | yes | 1.5 | 273 | n.a. | 21.1 | 4259 |

TABLE 1-continued

| Sample # | Q [kg/h] | NPPDA [g/min] | PTSA [% NPPDA] | THF yes/no | Tv [min] | Tr [° C.] | Tp [° C.] | anh/anh₀ [%] | NPPDA* [ppm] |
|---|---|---|---|---|---|---|---|---|---|
| 40-11 | 3 | 2.17 | 1 | yes | 12 | 256 | n.a. | 4.4 | 2465 |
| 40-12 | 30 | 21.69 | 4 | yes | 1.5 | 253 | 288 | 17.6 | 2513 |
| 40-13 | 50 | 36.14 | 4 | yes | 1.3 | 259 | 302 | 19.2 | 2896 |
| 40-14 | 40 | 28.91 | 3 | yes | 1.4 | 257 | 289 | 19.4 | 3112 |
| 40-15 | 10 | 7.23 | 3 | yes | 4 | 271 | 297 | 11.2 | 500 |
| 40-16 | 10 | 7.23 | 3 | yes | 4 | 260 | 293 | 8.6 | 934 |
| 40-17 | 10 | 7.23 | 3 | yes | 4 | 283 | 316 | 4.4 | 1123 |
| 40-18 | 40 | 24.97 | 2 | no | 1.4 | 261 | 304 | 28.3 | 2002 |
| 40-19 | 40 | 24.97 | 3 | no | 1.4 | 260 | 305 | 23.8 | 1401 |
| 40-20 | 40 | 24.97 | 4 | no | 1.4 | 260 | 304 | 22.8 | 978 |
| 40-21 | 40 | 30.75 | 4 | no | 1.4 | 260 | 304 | 13.4 | 3340 |
| 40-21 | 40 | 30.75 | 4 | no | 1.4 | 260 | 304 | 13.4 | 3340 |
| 40-22 | 30 | 19.71 | 2 | yes | 1.5 | 248 | 292 | 22.8 | 2093 |
| 40-23 | 50 | 32.86 | 2 | yes | 1.3 | 256 | 305 | 25.7 | |
| 40-24 | 30 | 19.71 | 4 | yes | 1.5 | 254 | 287 | 20.8 | 3308 |
| 40-25 | 40 | 26.29 | 3 | yes | 1.4 | 257 | 297 | 22.8 | 2082 |
| 40-26 | 40 | 26.29 | 2 | yes | 1.3 | 253 | 296 | 22.4 | 2901 |
| 40-27 | 60 | 41.40 | 4 | yes | 1.25 | 262 | 307 | 20.4 | 2732 |
| 40-28 | 30 | 20.70 | 3 | yes | 1.5 | 253 | 271 | 20 | 2538 |
| 40-29 | 40 | 27.60 | 2 | yes | 1.4 | 251 | 290 | 23.8 | |
| 40-30 | 40 | 27.60 | 4 | yes | 1.4 | 256 | 295 | 23.8 | 1560 |
| L40-31 | 40 | 26.02 | 3 | no | 4.5 | 273 | 307 | 11.5 | 68 |
| L40-32 | 30 | 18.93 | 3 | no | 5.5 | 271 | 305 | 12.8 | 64 |
| L40-33 | 30 | 18.93 | 3 | no | 5.5 | 269 | 297 | 14.6 | 65 |
| L40-34 | 40 | 26.02 | 3 | no | 4.5 | 269 | 307 | 13.6 | 113 |
| L40-35 | 40 | 26.02 | 3 | no | 4.5 | 284 | 312 | 14 | 46 |
| L40-36 | 40 | 28.39 | 3 | no | 4.5 | 287 | 310 | 6 | 64 |
| L40-37 | 40 | 26.02 | 3 | no | 4.5 | 287 | 310 | 14.3 | 62 |

*NPPDA is the sum of free and amide-bound NPPDA

In FIG. 3 the residual anhydride is plotted against the residence time for all Examples and Comparative Experiments. Lines have been drawn through all the points wherein an acid was present in the reaction (lower line) and the points wherein no acid was present during the reaction. FIG. 3 clearly shows that the residual anhydride is about 75% lower after a reaction in the presence of an acid than after a reaction without an acid, thus making a compound that could not be made before. The invention therefore also relates to a solid compound, and in particular a solid multifunctional viscosity modifier comprising a polymer containing between 0.1 and 10 functional groups per 1000 C-atoms, the functional groups comprising mainly aromatic amine-based imide groups, characterized in that the ratio of imide groups with respect to the functional groups is more than 0.85, preferably more than 0.90 and most preferably more than 0.95. From table 1, the ratio of imide groups with respect to the functional groups, calculated as (100-anh/anh₀)/100, it can be seen that this ratio in the Comparative Experiments is at most 0.81.

Comparison of the Examples 40-14, 40-29 and 40-30 with an average residual anhydride level of 21% with the Examples L40-34 and L40-36 with an average residual anhydride level of 10% shows that the process according to the invention at a throughput of 40 kg/h in an extruder with the static mixer ("L" numbered samples in Table 1) results in less than 50% residual anhydride than the process without static mixer.

FIG. 4 comprises the experiments according to the invention. In FIG. 4 the lower line connects the points with high rpm's and reaction temperatures, while the upper line fits through the points with lower rpm's and reaction temperatures. This Figure shows that with an rpm between 300 and 450 rpm and a reaction temperature between 275 and 290° C. a nearly 50% lower amount of residual anhydride is obtained.

In FIG. 5 the amount of free NPPDA and NPPDA present in the form of amide is plotted as a function of the throughput. The upper line is drawn through the Examples produced on the extruder of FIG. 1, while the lower line is produced on an extruder according to the configuration of FIG. 2. It is clearly shown in this picture that much lower residual NPPDA amount remain as a result of the presence of the static mixer and degassing extruder. This allows the use of the imidized polymer in lubricant oil without further additives to avoid discoloration of the NPPDA surplus. The invention therefore also relates to a lubricating oil, comprising the multifunctional viscosity modifier according to the invention and wherein the amount of low molecular weight aromatic polyamine comprising compound in the oil is smaller than 10 ppm.

The invention claimed is:

1. Process for preparing an imidized polymer which comprises reacting in a mixing or kneading device a mixture, comprising (i) an olefin copolymer comprising from 15 to 80 wt % of ethylene, from 20 to 85 wt % of a $C_3$-$C_{10}$ alpha-monoolefin, from 0 to 15 wt % of a polyene selected from non-conjugated dienes and trienes and from 0.1 to 10 anhydride groups or derivatives thereof per 1000 C-atoms, and (ii) an aromatic polyamine compound of which at least one of the amine groups is a primary amine, in the presence of between 1 and 4 mol % based on the amount of the polyamine of an acid.

2. Process according to claim 1, wherein the aromatic polyamine compound is selected from:
(a) an N-arylphenylenediamine represented by the formula:

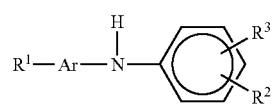

in which Ar is aromatic and $R^1$ is —H, —$NH_2$, —(—NH-Aryl)$_n$-H, —(—NH-Alkyl)$_n$-H, —NHarylalkyl, a branched or straight chain radical having from 4 to 24 carbon atoms that can be alkyl, alkenyl, alkoxyl, aralkyl, alkaryl, hydroxyalkyl or aminoalkyl, $R^2$ is
(—$NH_2$, —$(NH(CH_2)_n—)_m$—$NH_2$, —$(CH_2)_n$—$NH_2$, -aryl-$NH_2$, in which n and m has a value from 1 to 10, and $R^3$ is hydrogen, alkyl, alkenyl, alkoxyl, aralkyl, alkaryl having from 4 to 24 carbon atoms, preferably is $R^1$ equal H, $R^2$ equal —NH2, and $R^3$ equal H, which is N-phenyl phenylene diamine (NPPDA) and its isomers,
(b) an aminocarbazole represented by the formula:

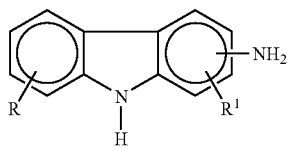

in which R and $R^1$ represent hydrogen or an alkyl, alkenyl, or alkoxyl radical having from 1 to 14 carbon atoms,
(c) an aminoindole represented by the formula:

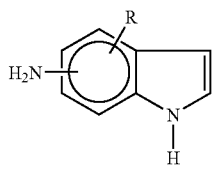

in which R represents hydrogen or an alkyl radical having from 1 to 14 carbon atoms,
(d) an amino-indazolinone represented by the formula:

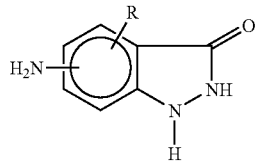

in which R is hydrogen or an alkyl radical having from 1 to 14 carbon atoms,
(e) an aminomercaptotriazole represented by the formula:

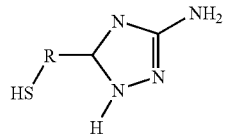

in which R can be absent or can be $C_1$-$C_{10}$ linear or branched hydrocarbon selected from the group consisting of alkyl, aryl, alkaryl, or arylalkyl,
(f) an aminopyrimidine represented by the formula:

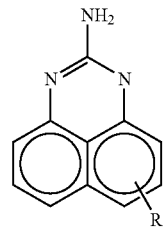

in which R represents hydrogen or an alkyl or alkoxyl radical having from 1 to 14 carbon atoms.

3. Process according to claim 1, wherein the acid has a pKa <4.

4. Process according to claim 3, wherein the acid is PTSA or DBSA.

5. Process according to claim 4, wherein the amount of PTSA is between 1 and 3 mol % based on the polyamine.

6. Process according to claim 1, wherein the mixing device is a twin screw extruder.

7. Process according to claim 1, wherein at least the last part of the reaction is carried out in a static mixer device or a kneading device.

8. Process according to claim 7, wherein the reaction mixture is degassed after the static mixer device or kneading device by means of an in line single screw extruder.

9. Process according to claim 1, wherein the molar ratio between the aromatic polyamine compound and the anhydride groups of the polymer is between 0.9 and 1.2.

10. Process according to claim 1, wherein the temperature of the reaction mixture in the static mixer device is at least 275° C.

11. A solid multifunctional viscosity modifier comprising a polymer comprising between 0.1 and 10 functional groups per 1000 C-atoms, wherein the functional groups comprising aromatic amine-based imide groups, and wherein the imide and functional groups are present in a ratio of the imide groups to the functional groups of more than 0.85.

12. Lubricating oil composition, comprising the solid multifunctional viscosity modifier according to claim 11, wherein the amount of low molecular weight aromatic polyamine comprising compound in the oil is smaller than 10 ppm.

13. The solid multifunctional viscosity modifier as in claim 11, wherein the ratio of the imide groups to the functional groups is more than 0.90.

14. The solid multifunctional viscosity modifier as in claim 11, wherein the ratio of the imide groups to the functional groups is more than 0.95.

* * * * *